Patented Oct. 25, 1949

2,486,191

UNITED STATES PATENT OFFICE 2,486,191

PROCESS OF POLYMERIZING ACRYLAMIDE

Louis M. Minsk, William O. Kenyon, and John H. Van Campen, Rochester, N. Y., assignors to Eastman Kodak Company, Rochester, N. Y., a corporation of New Jersey No Drawing. Application July 22, 1946, Serial No. 685,378

4 Claims. (Cl. 260—89.7)

This invention relates to a process of controlled polymerization and more particularly to a process for obtaining water-soluble polyacrylamides and alpha-methacrylamides of variable molecular weights from monomeric acrylamide and methacrylamide.

It is well known that the method employed in the polymerization of an unsaturated compound markedly influences the physical and chemical characteristics of the resulting polymeric product. For example, polymerizations conducted in mass generally favor the formation of insoluble three-dimensional type polymers, [Moureau-Ann. chim. (7), 2, 175 (1894); Staudinger and Urech-Helv. chim. Acta 12, 1107 (1929)], whereas polymerizations brought about in solution of an inert solvent, due to the proximity of the chains being greatly reduced, generally favor the formation of linear polymers possessing greater solubility and in some cases lower molecular weights. Various esters of acrylic acid and alpha-methacrylic acid have been polymerized in alcohol solutions containing substantial proportions of water, the products being of lower molecular weight and insoluble in the alcohol-water polymerization mediums. Still other polymerizations of various esters of acrylic and methacrylic acids have been made in alcohol-water mixtures, in which the polymers were insoluble, in order to obtain the polymeric products in the form of mushy or gel-like masses which were more readily workable into finely divided states for the manufacture of molding compositions, lacquers and the like. Other products have been prepared by polymerizations in water in the presence of per-salts such as ammonium persulfate, benzoyl peroxide and hydrogen peroxide. However, none of these methods describe a means for obtaining polyacrylamides of desired molecular weight and solubility.

We have now found that by polymerizing monomeric acrylamide or monomeric methacrylamide in a water medium containing from approximately 5 to 40 per cent by volume of a water-miscible alcohol, in the presence of a catalyst, for example, hydrogen peroxide, water-soluble polyacrylamides of controlled molecular weight can be obtained, depending upon the volume per cent of alcohol in the polymerization mixture of water and alcohol. Assuming that conditions of temperature and concentrations of catalyst and monomer are constant, with increasing amounts of alcohol, there are obtained polymers of progressively decreasing molecular weights. The most viscous and correspondingly higher molecular weight polymers are obtained by polymerization in water alone. More specifically, the alcohol employed in our process can be, for example, methyl, ethyl, propyl, isopropyl or tertiary butyl alcohols, and the catalyst can be a water-soluble type, i. e., one which is soluble in the solvent mixture, such as hydrogen peroxide, potassium persulfate, sodium perborate, and other similar kind of compound.

Structurally, the polymers obtained by our process of controlled polymerization can be represented by one of the following structures, depending on whether the polymerization of the monomeric acrylamide takes place in a random order, head to tail, or head to head, tail to tail, sequence:

1a.

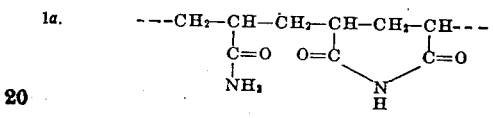

(Head to tail)

1b.

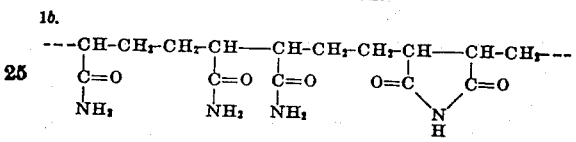

(Head to head, tail to tail)

The above formulas are only illustrative with no attempt made to place the respective groups upon a quantitative relationship. However, for definitive purposes, the term "combined acrylic acid" refers to the group

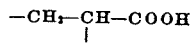

the term "acrylamide" to the group

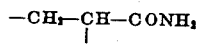

and the term "acrylimide" to the group

It is, accordingly, an object of our invention to provide a process for preparing water-soluble polyacrylamides of the kind above described. Another object is to provide a process for preparing such water-soluble polyacrylamides in a controlled range of molecular weight. Other objects will become apparent hereinafter.

It is an established fact that the viscosity of a polymer in solution is substantially a direct measure of the molecular weight of the polymer, i. e., for a given solids content, the lower the molecular weight of the polymer the lower will be the viscosity of the solution containing it. For the purpose of our invention, the molecular weights are presented in terms of specific, intrinsic and relative viscosities. The specific viscosity can be determined in water at a concentration of 0.100 gram of the polymer per 100 c. c. of solution, the flow times being determined in an Ostwald viscosimeter at a temperature of 25° C., and is calculated from the measured flow time of the solution, divided by the flow time of the solvent alone, minus one. The intrinsic viscosity can be used in place of specific viscosity and is defined by the following equation:

$$\frac{\log_e \eta_r}{C}$$

in which $\eta_r$ is the relative viscosity of a dilute water solution of the polymer divided by the viscosity of the water in the same units and at the same temperature, and C is the concentration in grams of polymer per 100 c. c. of solution. In Tables II and III, the concentration C represents 0.250 gram of the polymer in 100 c. c. of water. In order to place the specific and intrinsic values of viscosity on a comparative basis and thereby provide a measure of the specific reduction of the viscosities of the polyacrylamides obtained by polymerizing acrylamide in the various water-alcohol mixtures as compared to the polyacrylamide obtained when polymerization is made in water alone, the viscosity of the polymer obtained in water alone has been taken as unity and the viscosities of the polymers obtained in water-alcohol mixtures, in the same series, have been calculated to fractional values termed "viscosity ratio." For example, the viscosity ratio of a polyacrylamide obtained by polymerizing acrylamide in a 70–30 water-methyl alcohol mixture is given in Table II as 0.528, and was calculated by dividing its intrinsic viscosity value of 0.93 by the intrinsic viscosity value of 1.76 for the polymer obtained by polymerizing acrylamide in water alone.

The process of this invention is described more specifically in the following examples:

EXAMPLE 1.—POLYMERIZATION OF ACRYLAMIDE IN WATER-ETHANOL MIXTURES

The acrylamide was prepared by passing dry ammonia gas into acrylyl chloride dissolved in dry benzene. After filtering off the ammonium chloride, the filtrate was chilled and the acrylamide obtained in the form of crystals. The crystals were purified by recrystallization from benzene and dried under constant vacuum. The melting point of the purified crystals of acrylamide was 85.0°–85.2° C., and the nitrogen content 19.53 per cent by weight as compared to calculated theoretical of 19.72 per cent.

In all-glass reflux units, there were placed 200 c. c. volume of water-alcohol mixtures of the compositions given in Table I. To each of these mixtures were added 20 grams of acrylamide, prepared as above described, and 0.8 c. c. of 30 per cent hydrogen peroxide. The reactions were heated in a 90° C. bath for a period of two and one-half hours. The viscosities of the dopes so obtained were found to be in decreasing order with increasing amount of ethanol. The sample containing 40 per cent of alcohol turned cloudy on cooling, whereas the 50 per cent sample was cloudy at 90° C. The samples were precipitated by pouring into excess of ethanol, the precipitates extracted with fresh portions of ethanol and dried first in a vacuum desiccator under constant vacuum, and then to constant weight at 55° C. at atmospheric pressure. The specific viscosities of the respective samples were then determined in an Ostwald viscosimeter at 25° C., at a concentration of 0.100 gram made up to 100 c. c. in distilled water.

TABLE I

*Effect of alcohol concentration on the viscosity of obtained polyacrylamide*

| Per Cent Alcohol by Volume | Specific Viscosity in Water | Viscosity Ratio Water-Alcohol/Water |
|---|---|---|
| 00 | 0.127 | 1.000 |
| 05 | 0.098 | 0.772 |
| 10 | 0.076 | 0.598 |
| 20 | 0.045 | 0.354 |
| 30 | 0.040 | 0.315 |
| 40 | 0.032 | 0.252 |

In place of acrylamide in the above example, there can be substituted alpha-methacrylamide to obtain a similar series of related products decreasing in molecular weight with increasing amount of alcohol in the polymerization mixtures.

EXAMPLE 2.—POLYMERIZATION OF ACRYLAMIDE IN 70–30 WATER ALCOHOL MIXTURES

In all-glass reflux units, were placed acrylamide, prepared in the manner described in Example 1, and mixtures of water and alcohol in the ratio of one gram of acrylamide to 10 c. c. of the water-alcohol mixture. The mixtures of water and alcohol had been previously made up by volume, and the amount required in the different polymerizations were removed from the stock solutions. To the polymerization mixture in each sample was added 30 per cent hydrogen peroxide in an amount equal to 0.04 c. c. per gram of acrylamide. The polymerization mixtures were then heated in a 90° C. bath for two and one-half hours. Simultaneously, a control using water only as the polymerization solvent was run. In those cases where precipitation had occurred, water was added to the reaction mixture after polymerization to effect re-solution of the precipitated polymer. The dopes were then precipitated in absolute ethyl alcohol and the precipitated polymers thoroughly extracted with fresh portions of absolute ethyl alcohol. The polymers were dried in a vacuum desiccator under constant vacuum. The intrinsic viscosities were determined in each case at a concentration of 0.250 gram of polymer in 100 c. c. of water solution. The results are shown in Table II and III for mixtures of 70–30 water-alcohol and 60–40 water-alcohol for methyl, propyl, isopropyl and tertiary butyl alcohols.

TABLE II

*Polymerization of acrylamide in 70:30 water-alcohol mixtures*

| Solvent | Intrinsic Viscosity | Condition of hot dope after polymerization | Viscosity Ratio Water-Alcohol/Water |
|---|---|---|---|
| Water only | 1.76 | Clear | 1.000 |
| Methyl alcohol | 0.93 | do | 0.528 |
| Ethyl alcohol | | do | ¹ 0.315 |
| n-propyl alcohol | 0.44 | do | 0.250 |
| Isopropyl alcohol | 0.24 | do | 0.136 |
| Tertiary butyl alcohol | 1.45 | Some precipitation | 0.824 |

¹ From Table I.

TABLE III

*Polymerization of acrylamide in 60:40 water-alcohol mixtures*

| Solvent | Intrinsic Viscosity | Condition of hot dope after polymerization | Viscosity Ratio Water-Alcohol/Water |
|---|---|---|---|
| Water only | 2.40 | Clear | 1.000 |
| Methyl alcohol | 1.17 | ----do---- | 0.488 |
| Ethyl alcohol | | ----do---- | [1] 0.252 |
| n-propyl alcohol | 0.44 | Turbid, some precipitation | 0.183 |
| Isopropyl alcohol | 0.29 | Turbid | 0.121 |
| Tertiary butyl alcohol | 1.77 | Turbid, with precipitation | 0.737 |

[1] From Table I.

The polyacrylamides prepared by our controlled process of polymerization in water-alcohol mixtures are water-soluble and are characterized by having a content of about 20 per cent by weight of acrylimide groups, less than one per cent of combined acrylic acid groups, but in some cases as high as 3 per cent where polymerization heating period has been unduly prolonged, and the balance polyacrylamide groups, and further characterized by the fact that their aqueous solutions are unaffected in solubility, when the pH and temperature of the solutions are lowered.

What we claim is:

1. A process for preparing a water-soluble polyacrylamide which comprises dissolving acrylamide in the ratio of 1 gram of the acrylamide to each 10 c. c. of a mixed solvent consisting of from 60 to 95 parts by volume of water and from 40 to 5 parts by volume of a completely water-miscible, saturated monohydroxy aliphatic alcohol containing from 1 to 4 carbon atoms, and heating the resulting solution at a temperature of 90° C. in the presence of 0.04 c. c. of 30 per cent hydrogen peroxide to each gram of acrylamide.

2. A process for preparing a water-soluble polyacrylamide which comprises dissolving acrylamide in a mixture of water and alcohol in the ratio of 1 gram of acrylamide to 10 c. c. of the mixture consisting of from 60 to 95 parts by volume of water and from 40 to 5 parts by volume of ethanol, and heating the resulting solution at a temperature of 90° C. in the presence of 0.04 c. c. of 30 per cent hydrogen peroxide to each gram of acrylamide hydrogen peroxide.

3. A process for preparing a water-soluble polyacrylamide which comprises dissolving acrylamide in a mixture of water and alcohol in the ratio of 1 gram of acrylamide to 10 c. c. of the mixture consisting of from 60 to 95 parts by volume of water and from 40 to 5 parts by volume of methanol, and heating the resulting solution at a temperature of 90° C. in the presence of 0.04 c. c. of 30 per cent hydrogen peroxide to each gram of acrylamide hydrogen peroxide.

4. A process for preparing a water-soluble polyacrylamide which comprises dissolving acrylamide in a mixture of water and alcohol in the ratio of 1 gram of acrylamide to 10 c. c. of the mixture consisting of from 60 to 95 parts by volume of water and from 40 to 5 parts by volume of isopropanol, and heating the resulting solution at a temperature of 90° C. in the presence of 0.04 c. c. of 30 per cent hydrogen peroxide to each gram of acrylamide hydrogen peroxide.

LOUIS M. MINSK.
WILLIAM O. KENYON.
JOHN H. VAN CAMPEN.

REFERENCES CITED

The following references are of record in the file of this patent:

UNITED STATES PATENTS

| Number | Name | Date |
|---|---|---|
| 2,289,540 | Dittmar et al. | July 14, 1942 |

FOREIGN PATENTS

| Number | Country | Date |
|---|---|---|
| 467,402 | Great Britain | June 11, 1937 |
| 475,671 | Great Britain | Nov. 24, 1937 |